(12) United States Patent
Yamaguchi et al.

(10) Patent No.: US 9,588,454 B2
(45) Date of Patent: Mar. 7, 2017

(54) METHOD OF PRODUCING AN ELECTRICALLY CONDUCTIVE ROLLER FROM A RUBBER FOAM TUBE

(71) Applicant: SUMITOMO RUBBER INDUSTRIES, LTD., Kobe-shi, Hyogo (JP)

(72) Inventors: Takuya Yamaguchi, Kobe (JP); Shunichi Yabushita, Kobe (JP); Yusuke Tanio, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 546 days.

(21) Appl. No.: 14/090,840

(22) Filed: Nov. 26, 2013

(65) Prior Publication Data

US 2014/0162861 A1   Jun. 12, 2014

(30) Foreign Application Priority Data

Dec. 11, 2012 (JP) ................... 2012-270602

(51) Int. Cl.
   *G03G 15/00*   (2006.01)
   *B29C 47/00*   (2006.01)
   (Continued)

(52) U.S. Cl.
   CPC ............. *G03G 15/00* (2013.01); *B29C 35/06* (2013.01); *B29C 35/10* (2013.01); *B29C 47/0023* (2013.01); *B29C 47/0042* (2013.01); *B29C 47/882* (2013.01); *B29C 47/8805* (2013.01); *B29C 47/92* (2013.01); *B29C 35/045* (2013.01);
   (Continued)

(58) Field of Classification Search
   CPC ........ G03G 15/00; B29C 35/10; B29C 35/06; B29C 47/8805; B29C 47/0042; B29C 47/882; B29C 47/0023; B29C 47/92; B29C 2035/0855; B29C 35/045; B29C 2947/92923; B29C 2947/92714;
   (Continued)

(56) References Cited

U.S. PATENT DOCUMENTS 3,914,356 A * 10/1975 Dembiak ................ B29C 47/92
                                              264/40.5
4,198,554 A *  4/1980 Wayne .................... B29C 35/10
                                              219/684
(Continued)

FOREIGN PATENT DOCUMENTS

JP         02098411 A  *  4/1990  ............. B26C 35/06
JP         2-98411 A       10/1990
(Continued)

*Primary Examiner* — Sarang Afzali
(74) *Attorney, Agent, or Firm* — Birch, Stewart, Kolasch & Birch, LLP

(57) ABSTRACT

A rubber foam tube (5) is produced by extruding a rubber composition into a tubular body (4) and feeding the tubular body (4) in an elongated state without cutting to pass the tubular body (4) through a microwave crosslinking device (8) and then through a hot air crosslinking device (9) for continuously foaming and crosslinking the rubber composition. At this time, a ratio V2/V1 between a speed V2 at which the tubular body (4) passes through the hot air crosslinking device (9) and a speed V1 at which the tubular body (4) passes through the microwave crosslinking device (8) is not less than 1.0 and not greater than 1.6.

2 Claims, 1 Drawing Sheet

(51) Int. Cl.
  *B29C 47/88* (2006.01)
  *B29C 47/92* (2006.01)
  *B29C 35/06* (2006.01)
  *B29C 35/10* (2006.01)
  *B29D 23/00* (2006.01)
  *B29C 35/04* (2006.01)
  *B29C 35/08* (2006.01)

(52) U.S. Cl.
  CPC ............. *B29C 2035/0855* (2013.01); *B29C 2947/92704* (2013.01); *B29C 2947/92714* (2013.01); *B29C 2947/92923* (2013.01); *B29D 23/001* (2013.01); *Y10T 29/49563* (2015.01)

(58) Field of Classification Search
  CPC ........ B29C 2947/92704; B29D 23/001; Y10T 29/4956; Y10T 29/49563; Y10T 29/49565
  See application file for complete search history.

(56) References Cited

U.S. PATENT DOCUMENTS

| | | | | |
|---|---|---|---|---|
| 4,490,316 | A | * | 12/1984 | Satzler ............... B29C 47/0023 156/393 |
| 5,108,683 | A | * | 4/1992 | Anand ............... B29C 47/0016 264/171.17 |
| 5,166,484 | A | * | 11/1992 | Young ................ B29C 35/0277 219/400 |
| 5,328,348 | A | * | 7/1994 | Kawamura ............ B29C 44/08 264/408 |
| 7,520,057 | B2 | * | 4/2009 | Imasaka ................ B29C 44/08 264/209.6 |
| 7,932,318 | B2 | * | 4/2011 | Hattori .................... C08L 71/03 252/511 |
| 2005/0080150 | A1 | | 4/2005 | Nakahama et al. |
| 2006/0280928 | A1 | | 12/2006 | Imasaka et al. |
| 2008/0015270 | A1 | | 1/2008 | Nakahama et al. |
| 2009/0182065 | A1 | | 7/2009 | Imasaka et al. |
| 2012/0008992 | A1 | | 1/2012 | Imasaka et al. |
| 2013/0330109 | A1 | | 12/2013 | Imasaka et al. |

FOREIGN PATENT DOCUMENTS

| | | |
|---|---|---|
| JP | 2005-133090 A | 5/2005 |
| JP | 2006-168171 A | 6/2006 |
| JP | 2010-145920 A | 6/2006 |
| JP | 2007-322729 A | 12/2007 |
| WO | WO 2006/085696 A1 | 8/2006 |

* cited by examiner

METHOD OF PRODUCING AN ELECTRICALLY CONDUCTIVE ROLLER FROM A RUBBER FOAM TUBE

TECHNICAL FIELD

The present invention relates to a rubber foam tube production method, an electrically conductive roller including a roller body produced from an electrically conductive rubber composition by the production method, and an image forming apparatus incorporating the electrically conductive roller.

BACKGROUND ART

In an electrophotographic image forming apparatus such as a laser printer, an electrostatic copying machine, a plain paper facsimile machine or a printer-copier-facsimile multifunction machine, for example, an image is generally formed on a surface of a sheet (the term "sheet" is herein defined to include a paper sheet, a plastic film such as an OHP film and the like, and this definition is effective in the following description) through the following process steps.

First, a surface of a photoreceptor body having photoconductivity is evenly electrically charged and, in this state, exposed to light, whereby an electrostatic latent image corresponding to an image to be formed on the sheet is formed on the surface of the photoreceptor body (charging step and exposing step).

Then, a toner (minute color particles) preliminarily electrically charged at a predetermined potential is brought into contact with the surface of the photoreceptor body. Thus, the toner selectively adheres to the surface of the photoreceptor body according to the potential pattern of the electrostatic latent image, whereby the electrostatic latent image is developed into a toner image (developing step).

Subsequently, the toner image is transferred onto the surface of the sheet (transfer step), and fixed to the surface of the sheet (fixing step). Thus, the image is formed on the surface of the sheet.

In the transfer step, the toner image formed on the surface of the photoreceptor body may be directly transferred to the surface of the sheet, or may be once transferred to a surface of an image carrier (first transfer step) and then transferred to the surface of the sheet (second transfer step).

Further, toner remaining on the surface of the photoreceptor body after the transfer is removed (cleaning step). Thus, a series of process steps for the image formation are completed.

In the photoreceptor charging step, the developing step, the transfer step and the cleaning step out of the series of process steps, electrically conductive rollers are widely used, which each include a roller body produced from a rubber foam tube foamed and imparted with an electrically conductive property suitable for a use purpose thereof.

In order to produce the rubber foam tube for the roller body at lower costs at higher productivity, a continuous production method is preferably employed, for example, which includes the steps of extruding an electrically conductive rubber composition containing a foaming agent into a tubular body through a nozzle of an extruder, and continuously feeding the extruded tubular body in an elongated state without cutting to pass the tubular body through a microwave crosslinking device and a hot air crosslinking device of a continuous crosslinking apparatus to continuously foam and crosslink the rubber composition (see, for example, Patent Literatures 1 to 3).

For production of the electrically conductive roller, an electrically conductive rubber foam tube is produced, for example, from an electrically conductive rubber composition by the aforementioned production method, and cut to a predetermined length to form a roller body. Then, a shaft is inserted into a center through-hole of the roller body and fixed to the roller body, and the outer peripheral surface of the roller body is polished to be finished as having a predetermined outer diameter. Thus, the electrically conductive roller is produced, which includes the predetermined-diameter roller body and the shaft unified together.

Where the electrically conductive roller is produced by cutting and polishing the rubber foam tube formed through the foaming and the crosslinking under the conventional conditions disclosed in Patent Literatures 1 to 3 with the use of the continuous crosslinking apparatus, however, the outer diameter of the roller body of the electrically conductive roller is liable to gradually increase to significantly change after the production.

Therefore, even if the roller body is accurately finished so as to have a predetermined outer diameter in the polishing step in a production plant, for example, the roller body is often rejected due to an outer diameter dimensional error at customer's acceptance inspection. This may significantly reduce the production yield of the electrically conductive roller.

The change in outer diameter continues for at least about two weeks after the production. Even if the post-polishing outer diameter of the roller body is specified based on an expected dimensional change, the dimensional error occurs due to variation in the time of the customer's acceptance inspection. This also results in reduction in the production yield of the electrically conductive roller.

The outer diameter of the roller body of the electrically conductive roller should be strictly controlled in order to maintain the nip width and the nip pressure at constant levels for proper image formation, for example, when the electrically conductive roller is incorporated in an image forming apparatus and brought into press contact with the photoreceptor body or the like.

CITATION LIST

[Patent Literature]
[PATENT LITERATURE 1] JP2006-168171A1
[PATENT LITERATURE 2] JP2007-322729A1
[PATENT LITERATURE 3] JP2010-145920A1

SUMMARY OF THE INVENTION

Problem to be Solved by the Invention

It is an object of the present invention to provide a production method for producing a rubber foam tube for a roller body, which improves the production yield of an electrically conductive roller over the conventional methods, to provide an electrically conductive roller including a roller body produced from the rubber foam tube produced by the aforementioned production method, and to provide an image forming apparatus which incorporates the electrically conductive roller.

Means for Solving the Problems

According to an inventive aspect, there is provided a production method for producing a rubber foam tube, the method including the steps of: extruding a rubber composition containing a foaming agent into a tubular body; continuously feeding the extruded tubular body in an elongated state without cutting to pass the tubular body through a microwave crosslinking device and then through a hot air crosslinking device to continuously foam and crosslink the rubber composition; wherein a ratio V2/V1 between a speed V2 at which the tubular body passes through the hot air crosslinking device and a speed V1 at which the tubular body passes through the microwave crosslinking device is not less than 1.0 and not greater than 1.6.

According to another inventive aspect, there is provided an electrically conductive roller which includes a roller body produced from the rubber foam tube produced by the aforementioned production method.

In the conventional methods disclosed in Patent Literatures 1 to 3, the speed V1 (m/min) at which the tubular body passes through the microwave crosslinking device is specified in consideration of the efficiencies of the foaming and the crosslinking by irradiation with microwave in the foaming and crosslinking step, the output of the microwave crosslinking device, the outer diameter and the inner diameter of the tubular body, the productivity of the rubber foam tube, or the like.

According to studies conducted by the inventor of the present invention, the speed V2 (m/min) at which the tubular body passes through the hot air crosslinking device is specified so as to set the ratio V2/V1 much greater than an upper limit of 1.6 in consideration of the axial elongation of the tubular body due to the foaming in the conventional production methods. This aims at preventing the tubular body axially elongated due to the foaming from becoming wavy or clogged in the microwave crosslinking device or the hot air crosslinking device, or aims at preventing inhibition of the foaming of the tubular body.

This supposedly increases the change in the diameter of the roller body after the production in the conventional production methods. That is, the rubber foam tube is liable to expand radially perpendicularly to the axis thereof when cells of the rubber foam tube significantly axially elongated in the foaming and crosslinking step are contracted axially of the rubber foam tube to restore their ideal spherical shapes. This supposedly causes the change in the diameter of the rubber foam tube.

According to the present invention, in contrast, the ratio V2/V1 between the speeds V2 and V1 is not greater than 1.6, whereby the cells of the rubber foam tube are substantially prevented from being significantly axially elongated. Thus, the radial expansion of the cells is suppressed when the cells are axially contracted. This makes it possible to minimize the change in the outer diameter of the roller body after the production.

This significantly reduces the percentage of the outer diameter dimensional error of the roller body to remarkably improve the production yield of the electrically conductive roller in the production of the electrically conductive roller, even if the customer's acceptance inspection is carried out at different times after the roller body is accurately finished so as to have a predetermined outer diameter in the polishing step or the outer diameter is specified based on the expected dimensional change.

The ratio V2/V1 is limited to not less than 1.0. If the ratio V2/V1 is less than 1.0, the tubular body axially elongated due to the foaming is liable to become wavy or clogged in the microwave crosslinking device or the hot air crosslinking device, or the foaming of the tubular body is liable to be inhibited.

The inventive production method preferably includes the step of polishing an outer peripheral surface of an electrically conductive rubber foam tube produced by the foaming and the crosslinking so as to accurately finish the outer diameter of the roller body or so as to control the outer diameter of the roller body in consideration of the expected dimensional change.

An electrically conductive roller according to another inventive aspect may be incorporated in an electrophotographic image forming apparatus for use as a charging roller, a developing roller or a transfer roller.

According to further another inventive aspect, there is provided an image forming apparatus which includes the electrically conductive roller incorporated as any of the rollers described above.

According to the present invention, the production yield of the image forming apparatus can also be improved by incorporating the electrically conductive roller produced at a higher production yield by minimizing the dimensional error percentage.

Effects of the Invention

According to the present invention, the production yield of the electrically conductive roller can be improved over the conventional methods. Further, the production method ensures efficient production of the rubber foam tube for the roller body.

EMBODIMENTS OF THE INVENTION

Rubber Foam Tube Production Method

Figure 1:
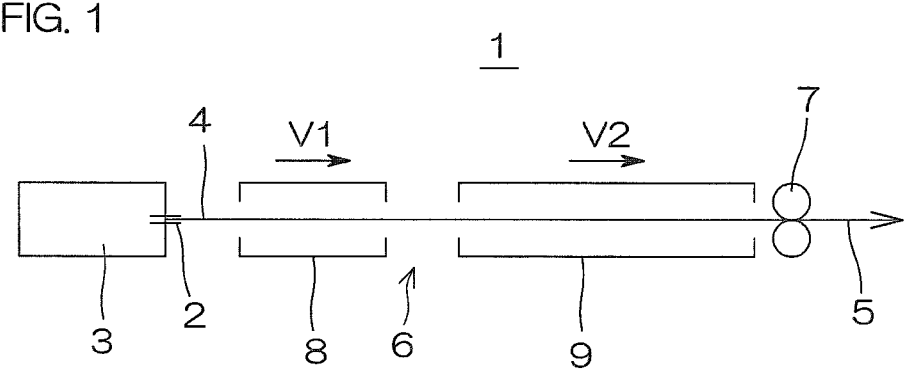
FIG. 1 is a block diagram for explaining an exemplary rubber foam tube production method according to an embodiment of the present invention.

FIG. 1 is a block diagram for explaining an exemplary rubber foam tube production method according to an embodiment of the present invention.

Referring to FIG. 1, a production apparatus 1 to be used for the exemplary production method includes an extruder 3 which continuously extrudes a rubber composition into a tubular body 4 through a nozzle 2, a continuous crosslinking apparatus 6 which crosslinks and foams the continuously extruded tubular body 4 to produce a rubber foam tube 5 while transporting the tubular body 4 in an elongated state without cutting, and a take-up device 7 which takes up the rubber foam tube 5 at a predetermined speed.

The continuous crosslinking apparatus 6 includes a microwave crosslinking device 8 and a hot air crosslinking device 9 which are provided in this order on a transport path along which the elongated tubular body 4 is continuously transported generally horizontally by a conveyor not shown.

For the production of the rubber foam tube 5 with the use of the production apparatus 1, a rubber, a foaming agent and other ingredients for the rubber foam tube 5 are first mixed together and kneaded, and the resulting rubber composition is formed in a ribbon shape and continuously fed into the extruder 3 to be continuously extruded into an elongated tubular body 4 through the nozzle 2 of the extruder 3 by operating the extruder 3.

In turn, the extruded tubular body 4 is continuously transported generally horizontally by the conveyor and the take-up device 7 to pass through the microwave crosslinking device 8 of the continuous crosslinking apparatus 6, whereby the rubber composition forming the tubular body 4 is crosslinked to a certain crosslinking degree by irradiation with microwave. Further, the inside of the microwave crosslinking device 8 is heated to a predetermined temperature, so that the rubber composition can be foamed and further crosslinked.

Subsequently, the tubular body 4 is further transported to pass through the hot air crosslinking device 9, whereby hot air is applied to the tubular body 4. Thus, the rubber composition is further foamed, and crosslinked to a predetermined crosslinking degree. Then, the tubular body 4 is passed through cooling water not shown to be thereby cooled. Thus, the tubular body 5 is continuously produced.

In the inventive production method employing the production apparatus 1, a ratio V2/V1 between a speed V2 at which the tubular body 4 passes through the hot air crosslinking device 9 and a speed V1 at which the tubular body 4 passes through the microwave crosslinking device 8 is set not greater than 1.6.

This suppresses the axial elongation of cells of the rubber foam tube 5, as described above, to suppress the radial expansion of the rubber foam tube 5 which may otherwise occur when the cells are axially contracted. Thus, the change in the outer diameter of the roller body can be minimized after the production.

For further improvement of this effect, the ratio V2/V1 is preferably not greater than 1.3 within the aforementioned range.

The ratio V2/V1 is herein set not less than 1.0 for the following reason. If the ratio V2/V1 is less than this range, the tubular body 4 axially elongated due to the foaming is liable to become wavy or clogged in the microwave crosslinking device 8 or the hot air crosslinking device 9, or the foaming of the tubular body 4 is liable to be inhibited.

In order to reliably prevent these problems, the ratio V2/V1 is preferably not less than 1.2 in the aforementioned range.

The speed V1 may be set within a given range in consideration of the efficiencies of the foaming and the crosslinking by the irradiation with the microwave, the output of the microwave crosslinking device, the outer diameter and the inner diameter of the tubular body, the productivity of the rubber foam tube, or the like as described above.

Where a tubular body having an outer diameter of about 10 to about 12 mm and an inner diameter of about 3 to about 4 mm is to be foamed and crosslinked with the use of a microwave crosslinking device 8 having an output of 6 kW and an internal control temperature of 160° C. as in Examples to be described later, for example, the speed V1 is preferably not less than about 6 m/min and not greater than about 8 m/min. Further, the speed V2 may be set not less than 1.0 time and not greater than 1.6 times the speed V1.

Even if the conditions for the crosslinking in the microwave crosslinking device 8 and the hot air crosslinking device 9 (e.g., the internal control temperature and the speeds V1, V2) vary, the roller body can be produced without the clogging of the tubular body by the aforementioned mechanism simply by setting the ratio V2/V1 between the speeds V2 and V1 within the aforementioned range, and yet has a minimum change in the outer diameter thereof after the production.

In order to control the speeds V1, V2, the transportation speed of the conveyor for transporting the tubular body 4 in the microwave crosslinking device 8, the transportation speed of the conveyor for transporting the tubular body 4 in the hot air crosslinking device 9 and the transportation speed of the take-up device 7 are individually controlled.

The tubular body 4 passing through the microwave crosslinking device 8 and the hot air crosslinking device 9 is softened by the heating. Therefore, the speed of the tubular body can be controlled relatively flexibly as described above.

<<Electrically Conductive Roller>>

Figure 2:
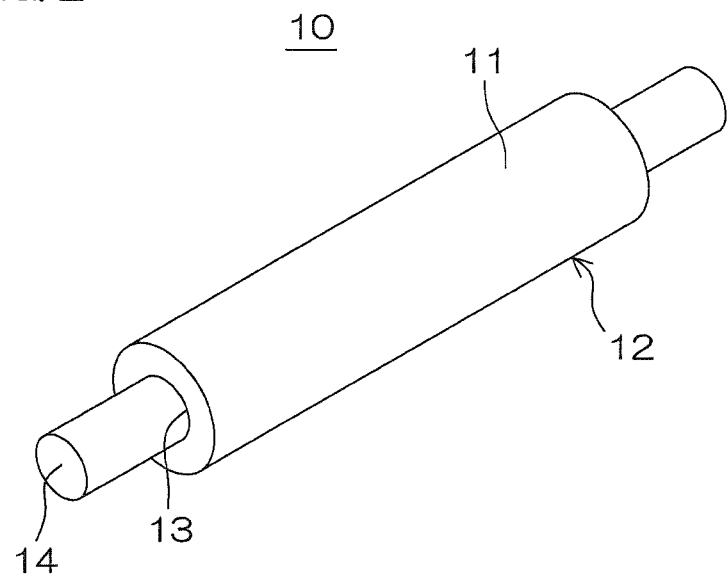
FIG. 2 is a perspective view of an exemplary electrically conductive roller including a roller body produced from a rubber foam tube produced by the inventive production method.

FIG. 2 is a perspective view of an exemplary electrically conductive roller including the roller body produced from the rubber foam tube 5 produced by the inventive production method.

Referring to FIG. 2, the exemplary electrically conductive roller 10 includes a roller body 12 produced by cutting the rubber foam tube 5 to a predetermined length and having an outer peripheral surface 11 polished as required to have a predetermined outer diameter and a predetermined surface roughness, and a shaft 14 inserted in a center through-hole 13 of the roller body 12 and fixed to the roller body 12.

The shaft 14 is a unitary member made of a metal such as aluminum, an aluminum alloy or a stainless steel. The roller body 12 and the shaft 14 are electrically connected and mechanically fixed to each other, for example, with an electrically conductive adhesive agent to be unified into the electrically conductive roller 10.

The electrically conductive roller 10 is produced, for example, by cutting the produced rubber foam tube 5 to the predetermined length of the roller body 12, inserting the shaft 14 into the through-hole 13 of the roller body 12, fixing the roller body 12 to the shaft 14 with the adhesive agent or the like, and polishing the outer peripheral surface 11 of the roller body 12 to the predetermined outer diameter.

The electrically conductive roller 10 may be incorporated in an electrophotographic image forming apparatus, for example, for use as a charging roller, a developing roller or a transfer roller.

A composition having a formulation suitable for the use purpose of the electrically conductive roller 10 may be employed as the electrically conductive rubber composition for the roller body 12.

Particularly, the electrically conductive rubber composition preferably contains an ion conductive rubber serving as a rubber component and as an electrical conductivity imparting agent to be thereby imparted with ion conductivity.

<<Electrically Conductive Rubber Composition>>

<Ion Conductive Rubber>

The ion conductive rubber and a crosslinkable rubber are preferably used in combination as the rubber component.

Examples of the ion conductive rubber include epichlorohydrin homopolymers, epichlorohydrin-ethylene oxide bipolymers (ECO), epichlorohydrin-propylene oxide bipolymers, epichlorohydrin-allyl glycidyl ether bipolymers, epichlorohydrin-ethylene oxide-allyl glycidyl ether terpolymers (GECO), epichlorohydrin-propylene oxide-allyl glycidyl ether terpolymers and epichlorohydrin-ethylene oxide-propylene oxide-allyl glycidyl ether quaterpolymers, which may be used either alone or in combination.

Of the aforementioned examples, the ethylene oxide-containing copolymers, particularly the ECO and/or the GECO are preferred as the epichlorohydrin rubber.

These copolymers preferably each have an ethylene oxide content of not less than 30 mol % and not greater than 80 mol %, particularly preferably not less than 50 mol %.

Ethylene oxide functions to reduce the roller resistance of the electrically conductive roller 10. If the ethylene oxide content is less than the aforementioned range, however, it will be impossible to sufficiently provide the roller resistance reducing function and hence to sufficiently reduce the roller resistance of the electrically conductive roller 10.

If the ethylene oxide content is greater than the aforementioned range, on the other hand, ethylene oxide is liable to be crystallized, whereby the segment motion of molecular chains is hindered to adversely increase the roller resistance of the electrically conductive roller 10. Further, the roller body 12 is liable to have a higher hardness after the crosslinking, and the electrically conductive rubber composition is liable to have a higher viscosity when being heat-melted before the crosslinking.

The ECO has an epichlorohydrin content that is a balance obtained by subtracting the ethylene oxide content from the total. That is, the epichlorohydrin content is preferably not less than 20 mol % and not greater than 70 mol %, particularly preferably not greater than 50 mol %.

The GECO preferably has an allyl glycidyl ether content of not less than 0.5 mol % and not greater than 10 mol %, particularly preferably not less than 2 mol % and not greater than 5 mol %.

Allyl glycidyl ether per se functions as side chains of the copolymer to provide a free volume, whereby the crystallization of ethylene oxide is suppressed to reduce the roller resistance of the electrically conductive roller 10. However, if the allyl glycidyl ether content is less than the aforementioned range, it will be impossible to provide the roller resistance reducing function and hence to sufficiently reduce the roller resistance of the electrically conductive roller 10.

On the other hand, allyl glycidyl ether also functions as crosslinking sites during the crosslinking of the GECO. Therefore, if the allyl glycidyl ether content is greater than the aforementioned range, the crosslinking density of the GECO is increased, whereby the segment motion of molecular chains is hindered. This may adversely increase the roller resistance of the electrically conductive roller 10. Further, the roller body 12 is liable to suffer from reduction in tensile strength, fatigue resistance and flexural resistance.

The GECO has an epichlorohydrin content that is a balance obtained by subtracting the ethylene oxide content and the allyl glycidyl ether content from the total. That is, the epichlorohydrin content is preferably not less than 10 mol % and not greater than 69.5 mol %, particularly preferably not less than 19.5 mol % and not greater than 60 mol %.

Examples of the GECO include copolymers of the three comonomers described above in a narrow sense, as well as known modification products obtained by modifying an epichlorohydrin-ethylene oxide copolymer (ECO) with allyl glycidyl ether. In the present invention, any of these GECOs are usable.

The proportion of the epichlorohydrin rubber to be blended is preferably not less than 5 parts by mass and not greater than 40 parts by mass, particularly preferably not less than 10 parts by mass and not greater than 30 parts by mass, based on 100 parts by mass of the rubber component.

If the proportion of the epichlorohydrin rubber is less than the aforementioned range, it will be impossible to impart the roller body 12 with excellent ion conductivity.

If the proportion of the epichlorohydrin rubber is greater than the aforementioned range, on the other hand, the proportion of the crosslinkable rubber is relatively reduced. Therefore, it will be impossible to sufficiently provide effects of the blending of the crosslinkable rubber to be described later.

<Crosslinkable Rubber>

Usable as the crosslinkable rubber are a styrene butadiene rubber (SBR) and/or an acrylonitrile butadiene rubber (NBR). These rubbers are excellent in crosslinkability, and function to impart the crosslinked roller body 12 with excellent elasticity and flexibility.

If an ethylene propylene diene rubber (EPDM) is further blended as the crosslinkable rubber, the roller body 12 is improved in resistance to ozone to be generated in an image forming apparatus.

(SBR, NBR)

Usable as the SBR are various SBRs synthesized by copolymerizing styrene and 1,3-butadiene by various polymerization methods such as an emulsion polymerization method and a solution polymerization method. The SBRs include those of an oil-extension type having flexibility controlled by addition of an extension oil, and those of a non-oil-extension type containing no extension oil. Either type of SBRs is usable.

According to the styrene content, the SBRs are classified into a higher styrene content type, an intermediate styrene content type and a lower styrene content type, and any of these types of SBRs is usable. Physical properties of the roller body can be controlled by changing the styrene content and the crosslinking degree.

These SBRs may be used either alone or in combination.

Usable examples of the NBR include lower-acrylonitrile-content NBRs, intermediate-acrylonitrile-content NBRs, intermediate- and higher-acrylonitrile-content NBRs, higher-acrylonitrile-content NBRs, and very-high-acrylonitrile-content NBRs, which are classified according to the acrylonitrile content. These NBRs may be used either alone or in combination.

The SBR and the NBR may be used in combination.

The proportion of the SBR and/or the NBR to be blended is preferably not less than 40 parts by mass and not greater than 90 parts by mass, particularly preferably not less than 60 parts by mass and not greater than 80 parts by mass, based on 100 parts by mass of the rubber component.

If the proportion of the SBR and/or the NBR is less than the aforementioned range, it will be impossible to sufficiently provide the effect of imparting the electrically conductive rubber composition with proper crosslinkability and the effect of imparting the crosslinked roller body 12 with excellent elasticity and flexibility as described above by using the SBR and/or the NBR.

If the proportion of the SBR and/or the NBR is greater than the aforementioned range, the proportion of the EPDM is relatively reduced, making it impossible to impart the roller body 12 with excellent ozone resistance. Further, the proportion of the epichlorohydrin rubber is also relatively reduced, making it impossible to impart the roller body 12 with excellent ion conductivity.

Where an oil-extension type SBR is used, the proportion of the SBR described above is defined as the solid proportion of the SBR contained in the oil-extension type SBR. Where the SBR and the NBR are used in combination, the total proportion of the SBR and the NBR is within the aforementioned range.

(EPDM)

Usable as the EPDM are various EPDMs each prepared by introducing double bonds to a main chain thereof by employing a small amount of a third ingredient (diene) in addition to ethylene and propylene. Various products containing different types of third ingredients in different amounts are commercially available. Typical examples of the third ingredients include ethylidene norbornene (ENB), 1,4-hexadiene (1,4-HD) and dicyclopentadiene (DCP). A Ziegler catalyst is typically used as a polymerization catalyst.

The proportion of the EPDM to be blended is preferably not less than 5 parts by mass and not greater than 40 parts by mass, particularly preferably not greater than 20 parts by mass, based on 100 parts by mass of the rubber component.

If the proportion of the EPDM is less than the aforementioned range, it will be impossible to impart the roller body 12 with excellent ozone resistance.

If the proportion of the EPDM is greater than the aforementioned range, on the other hand, the proportion of the SBR and/or the NBR is relatively reduced, making it impossible to sufficiently provide the effect of imparting the electrically conductive rubber composition with proper crosslinkability and the effect of imparting the crosslinked roller body 12 with excellent elasticity and flexibility by blending the SBR and/or the NBR. Further, the proportion of the epichlorohydrin rubber is also relatively reduced, making it impossible to impart the roller body with excellent ion conductivity.

(Other Rubber)

A polar rubber such as a chloroprene rubber (CR), a butadiene rubber (BR) or an acryl rubber (ACM) may be blended as the rubber component to finely control the roller resistance of the electrically conductive roller 10.

<Foaming Agent>

Usable as the foaming agent are various foaming agents capable of generating a gas with heating to foam the electrically conductive rubber composition.

Specific examples of the foaming agents include azodicarbonamide ($H_2NOCN=NCONH_2$, ADCA), 4,4'-oxybis(benzenesulfonylhydrazide) (OBSH) and N,N-dinitrosopentamethylenetetramine (DPT), which may be used either alone or in combination.

The proportion of the foaming agent to be blended is preferably not less than 1 part by mass and not greater than 8 parts by mass, particularly preferably not less than 2 parts by mass and not greater than 6 parts by mass, based on 100 parts by mass of the rubber component.

If the proportion of the foaming agent is less than the aforementioned range, it will be impossible to properly foam the tubular body 4.

If the proportion of the foaming agent is greater than the aforementioned range, on the other hand, the outer and inner peripheral surfaces of the rubber foam tube 5 and the outer and inner peripheral surfaces of the roller body 12 each fail to have a perfectly round sectional shape due to gas generated in a great amount and a foaming pressure attributable to the generated gas. Further, the rubber foam tube 5 is liable to have an uneven inner diameter or an uneven cell distribution, so that the roller body 12 has variations in hardness and electrical conductivity.

In the present invention, the proportion of the foaming agent is preferably adjusted within the aforementioned range according to the speeds $V1$, $V2$ and the speed ratio $V2/V1$ described above.

As the speeds $V1$, $V2$ and the ratio $V2/V1$ increase, the tubular body 4 is more liable to be significantly axially elongated in the foaming and crosslinking step, thereby resulting in a higher expansion ratio.

As the speeds $V1$, $V2$ and the ratio $V2/V1$ decrease, conversely, the tubular body 4 is less liable to be significantly elongated in the foaming and crosslinking step, thereby resulting in a lower expansion ratio.

Therefore, the amount of the foaming agent is preferably adjusted within the aforementioned range according to the speeds $V1$, $V2$, the ratio $V2/V1$ and the required expansion ratio of the rubber foam tube to be produced.

A foaming assisting agent which reduces the decomposition temperature of the foaming agent to assist the foaming may be blended in the electrically conductive rubber composition. Urea is preferably used as the foaming assisting agent.

The proportion of the foaming assisting agent to be blended is not less than 1 part by mass and not greater than 5 parts by mass, particularly preferably not less than 2 parts by mass and not greater than 3 parts by mass, based on 100 parts by mass of the rubber component.

If the proportion of the foaming assisting agent is less than the aforementioned range, the foaming assisting agent fails to sufficiently provide the effect of assisting the foaming of the foaming agent, making it impossible to properly foam the tubular body 4.

If the proportion of the foaming assisting agent is greater than the aforementioned range, the foaming temperature of the foaming agent is excessively reduced, so that the foaming proceeds in an extremely short period of time. Therefore, the outer and inner peripheral surfaces of the rubber foam tube 5 and the outer and inner peripheral surfaces of the roller body 12 each fail to have a perfectly round sectional shape due to gas generated in a great amount and a foaming pressure attributable to the generated gas. Further, the rubber foam tube 5 is liable to have an uneven inner diameter or an uneven cell distribution, so that the roller body 12 has variations in hardness and electrical conductivity.

<Crosslinking Component>

A crosslinking component for crosslinking the rubber component is blended in the electrically conductive rubber composition. The crosslinking component includes a crosslinking agent and an accelerating agent.

Examples of the crosslinking agent include a sulfur crosslinking agent, a thiourea crosslinking agent, a triazine derivative crosslinking agent, a peroxide crosslinking agent and monomers, which may be used either alone or in combination. Among these crosslinking agents, the sulfur crosslinking agent is preferred.

Examples of the sulfur crosslinking agent include sulfur powder and organic sulfur-containing compounds. Examples of the organic sulfur-containing compounds include tetramethylthiuram disulfide and N,N-dithiobismorpholine. Sulfur such as the sulfur powder is particularly preferred.

The proportion of sulfur to be blended is preferably not less than 0.2 parts by mass and not greater than 5 parts by mass, particularly preferably not less than 1 part by mass and not greater than 3 parts by mass, based on 100 parts by mass of the rubber component.

If the proportion of sulfur is less than the aforementioned range, the electrically conductive rubber composition is liable to have a lower crosslinking speed as a whole, requiring a longer period of time for the crosslinking to reduce the productivity of the roller body. If the proportion of sulfur is greater than the aforementioned range, the roller body is liable to have a higher compression set after the crosslinking, or an excess amount of sulfur is liable to bloom on the outer peripheral surface of the roller body.

Examples of the accelerating agent include inorganic accelerating agents such as lime, magnesia (MgO) and litharge (PbO), and organic accelerating agents, which may be used either alone or in combination.

Examples of the organic accelerating agents include: guanidine accelerating agents such as di-o-tolylguanidine, 1,3-diphenylguanidine, 1-o-tolylbiguanide and a di-o-tolylguanidine salt of dicatechol borate; thiazole accelerating agents such as 2-mercaptobenzothiazole and di-2-benzothiazyl disulfide; sulfenamide accelerating agents such as N-cyclohexyl-2-benzothiazylsulfenamide; thiuram accelerating agents such as tetramethylthiuram monosulfide, tetramethylthiuram disulfide, tetraethylthiuram disulfide and dipentamethylenethiuram tetrasulfide; and thiourea accelerating agents, which may be used either alone or in combination.

According to the type of the crosslinking agent to be used, at least one optimum accelerating agent is selected from the various accelerating agents described above for use in combination with the crosslinking agent. For use in combination with sulfur, the accelerating agent is preferably selected from the thiuram accelerating agents and the thiazole accelerating agents.

Different types of accelerating agents have different crosslinking accelerating mechanisms and, therefore, are preferably used in combination. The proportions of the accelerating agents to be used in combination may be properly determined, and are preferably not less than 0.1 part by mass and not greater than 5 parts by mass, particularly preferably not less than 0.5 parts by mass and not greater than 2 parts by mass, based on 100 parts by mass of the rubber component.

The crosslinking component may further include an acceleration assisting agent.

Examples of the acceleration assisting agent include: metal compounds such as zinc white; fatty acids such as stearic acid, oleic acid and cotton seed fatty acids; and other conventionally known acceleration assisting agents, which may be used either alone or in combination.

The proportion of the acceleration assisting agent to be blended is properly determined according to the types and combination of the rubbers of the rubber component, and the types and combination of the crosslinking agent and the accelerating agent.

(Other Components)

As required, various additives may be added to the electrically conductive rubber composition. Examples of the additives include an acid accepting agent, a plasticizing component (a plasticizer, a processing aid and the like), a degradation preventing agent, a filler, an anti-scorching agent, a UV absorbing agent, a lubricant, a pigment, an anti-static agent, a flame retarder, a neutralizing agent, a nucleating agent, a co-crosslinking agent and the like.

In the presence of the acid accepting agent, chlorine-containing gases generated from the epichlorohydrin rubber during the crosslinking of the rubber component are prevented from remaining in the roller body. Thus, the acid accepting agent functions to prevent the inhibition of the crosslinking and the contamination of a photoreceptor body, which may otherwise be caused by the chlorine-containing gases.

Any of various substances serving as acid acceptors may be used as the acid accepting agent. Preferred examples of the acid accepting agent include hydrotalcites and Magsarat which are excellent in dispersibility. Particularly, the hydrotalcites are preferred.

Where the hydrotalcites are used in combination with magnesium oxide or potassium oxide, a higher acid accepting effect can be provided, thereby more reliably preventing the contamination of the photo receptor body.

The proportion of the acid accepting agent to be blended is preferably not less than 0.2 parts by mass and not greater than 5 parts by mass, particularly preferably not less than 0.5 parts by mass and not greater than 3 parts by mass, based on 100 parts by mass of the rubber component.

If the proportion of the acid accepting agent is less than the aforementioned range, it will be impossible to sufficiently provide the effect of the blending of the acid accepting agent. If the proportion of the acid accepting agent is greater than the aforementioned range, the roller body is liable to have an increased hardness after the crosslinking.

Examples of the plasticizer include plasticizers such as dibutyl phthalate (DBP), dioctyl phthalate (DOP) and tricresyl phosphate, and waxes such as polar waxes. Examples of the processing aid include fatty acids such as stearic acid.

The proportion of the plasticizing component to be blended is preferably not greater than 5 parts by mass based on 100 parts by mass of the rubber component. This prevents the contamination of the photoreceptor body, for example, when the electrically conductive roller is mounted in an image forming apparatus or when the image forming apparatus is operated. For this purpose, it is particularly preferred to use any of the polar waxes as the plasticizing component.

Examples of the degradation preventing agent include various anti-aging agents and anti-oxidants.

The anti-oxidants serve to reduce the environmental dependence of the roller resistance of the electrically conductive roller and to suppress increase in roller resistance during continuous energization of the electrically conductive roller. Examples of the anti-oxidants include nickel diethyldithiocarbamate (NOCRAC (registered trade name) NEC-P available from Ouchi Shinko Chemical Industrial Co., Ltd.) and nickel dibutyldithiocarbamate (NOCRAC NBC available from Ouchi Shinko Chemical Industrial Co., Ltd.)

Examples of the filler include zinc oxide, silica, carbon, carbon black, clay, talc, calcium carbonate, magnesium carbonate and aluminum hydroxide, which may be used either alone or in combination.

The blending of the filler improves the mechanical strength and the like of the roller body.

Electrically conductive carbon black may be used as the filler to impart the roller body with electrical conductivity.

The proportion of the filler to be blended is preferably not less than 5 parts by mass and not greater than 50 parts by mass, particularly preferably not greater than 20 parts by mass, based on 100 parts by mass of the rubber component.

Examples of the anti-scorching agent include N-cyclohexylthiophthalimide, phthalic anhydride, N-nitrosodiphenylamine and 2,4-diphenyl-4-methyl-1-pentene, which may be used either alone or in combination. Particularly, N-cyclohexylthiophthalimide is preferred.

The proportion of the anti-scorching agent to be blended is preferably not less than 0.1 part by mass and not greater than 5 parts by mass, particularly preferably not greater than 1 part by mass, based on 100 parts by mass of the rubber component.

The co-crosslinking agent serves to crosslink itself as well as the rubber component to increase the overall molecular weight.

Examples of the co-crosslinking agent include ethylenically unsaturated monomers typified by methacrylates, metal salts of methacrylic acid and acrylic acid, polyfunctional polymers utilizing functional groups of 1,2-polybutadienes, and dioximes, which may be used either alone or in combination.

Examples of the ethylenically unsaturated monomers include:
(a) monocarboxylic acids such as acrylic acid, methacrylic acid and crotonic acid;
(b) dicarboxylic acids such as maleic acid, fumaric acid and itaconic acid;
(c) esters and anhydrides of the unsaturated carboxylic acids (a) and (b);
(d) metal salts of the monomers (a) to (c);
(e) aliphatic conjugated dienes such as 1,3-butadiene, isoprene and 2-chloro-1,3-butadiene;
(f) aromatic vinyl compounds such as styrene, α-methylstyrene, vinyltoluene, ethylvinylbenzene and divinylbenzene;
(g) vinyl compounds such as triallyl isocyanurate, triallyl cyanurate and vinylpyridine each having a hetero ring; and
(h) cyanovinyl compounds such as (meth)acrylonitrile and α-chloroacrylonitrile, acrolein, formyl sterol, vinyl methyl ketone, vinyl ethyl ketone and vinyl butyl ketone. These ethylenically unsaturated monomers may be used either alone or in combination.

Monocarboxylic acid esters are preferred as the esters (c) of the unsaturated carboxylic acids.

Specific examples of the monocarboxylic acid esters include:
alkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, n-pentyl (meth)acrylate, i-pentyl (meth)acrylate, n-hexyl (meth)acrylate, cyclohexyl (meth)acrylate, 2-ethylhexyl (meth)acrylate, octyl (meth)acrylate, i-nonyl (meth)acrylate, tert-butylcyclohexyl (meth)acrylate, decyl (meth)acrylate, dodecyl (meth)acrylate, hydroxymethyl (meth)acrylate and hydroxyethyl (meth)acrylate;
aminoalkyl (meth)acrylates such as aminoethyl (meth)acrylate, dimethylaminoethyl (meth)acrylate and butylaminoethyl (meth)acrylate;
(meth)acrylates such as benzyl (meth)acrylate, benzoyl (meth)acrylate and aryl (meth)acrylates each having an aromatic ring;
(meth)acrylates such as glycidyl (meth)acrylate, methaglycidyl (meth)acrylate and epoxycyclohexyl (meth)acrylate each having an epoxy group;
(meth)acrylates such as N-methylol (meth)acrylamide, γ-(meth)acryloxypropyltrimethoxysilane, tetrahydrofurfuryl methacrylate each having a functional group; and
polyfunctional (meth)acrylates such as ethylene glycol di(meth)acrylate, trimethylolpropane tri(meth)acrylate, ethylene dimethacrylate (EDMA), polyethylene glycol dimethacrylate and isobutylene ethylene dimethacrylate. These monocarboxylic acid esters may be used either alone or in combination.

The electrically conductive rubber composition containing the aforementioned ingredients can be prepared in a conventional manner. First, the rubbers for the rubber component are blended in the predetermined proportions, and the resulting rubber component is simply kneaded. After additives other than the foaming agent component and the crosslinking component are added to and kneaded with the rubber component, the foaming agent component and the crosslinking component are finally added to and further kneaded with the resulting mixture. Thus, the electrically conductive rubber composition is provided.

A kneader, a Banbury mixer, an extruder or the like, for example, is usable for the kneading.

<<Image Forming Apparatus>>

The inventive image forming apparatus incorporates the inventive electrically conductive roller 10. Examples of the inventive image forming apparatus include various electrophotographic image forming apparatuses such as a laser printer, an electrostatic copying machine, a plain paper facsimile machine and a printer-copier-facsimile multifunctional machine.

EXAMPLES

Example 1

Preparation of Electrically Conductive Rubber Composition

A rubber component was prepared by blending 70 parts by mass of an NBR (a lower acrylonitrile content NBR JSR N250SL available from JSR Co., Ltd. and having an acrylonitrile content of 20%), 10 parts by mass of an EPDM (ESPRENE (registered trade name) EPDM505A available from Sumitomo Chemical Co., Ltd) and 20 parts by mass of an ECO (HYDRIN (registered trade name) T3108 available from Zeon Corporation).

A rubber composition was prepared by blending ingredients shown below in Table 1 with 100 parts by mass of the rubber component, and kneading the resulting mixture at 80° C. for 3 to 5 minutes by means of an enclosed kneader.

TABLE 1

| Ingredients | Parts by mass |
| --- | --- |
| Filler | 10 |
| Foaming agent | 4 |
| Acid accepting agent | 3 |
| Crosslinking agent | 1.5 |
| Accelerating agent DM | 0.5 |
| Accelerating agent TS | 0.5 |
| Acceleration assisting agent | 5 |

The ingredients shown in Table 1 are as follows. The amounts (parts by mass) of the ingredients shown in Table 1 are based on 100 parts by mass of the rubber component.
Filler: Carbon black HAF (SEAST 3 (trade name) available from Tokai Carbon Co., Ltd.)
Foaming agent: ADCA foaming agent (VINYFOR AC#3 (trade name) available from Eiwa Chemical Industry Co., Ltd.)
Acid accepting agent: Hydrotalcites (DHT-4A-2 available from Kyowa Chemical Industry Co., Ltd.)
Crosslinking agent: Sulfur powder (available from Tsurumi Chemical Industry Co., Ltd.)
Accelerating agent DM: Di-2-benzothiazyl disulfide (NOCCELER (registered trade name) DM available from Ouchi Shinko Chemical Industrial Co., Ltd.)
Accelerating agent TS: Tetramethylthiuram disulfide (NOCCELER TS available from Ouchi Shinko Chemical Industrial Co., Ltd.)
Acceleration assisting agent: Zinc oxide (available from Hakusui Tech Co., Ltd.)
(Production of Rubber Foam Tube)

The electrically conductive rubber composition was fed into the extruder 3 of the production apparatus 1 shown in FIG. 1, and extruded through the nozzle 2 into an elongated tubular body having an outer diameter of 10.5 mm and an inner diameter of 3.5 mm. The extruded tubular body 4 was continuously fed out in an elongated state without cutting to continuously pass through the continuous crosslinking apparatus 6 including the microwave crosslinking device 8 and the hot air crosslinking device 9, whereby the rubber composition of the tubular body was continuously crosslinked and foamed. Then, the resulting tubular body was passed through cooling water to be continuously cooled. Thus, a rubber foam tube 5 was produced.

The tubular body 4 was passed through the microwave crosslinking device 8 at a speed V1 of 6.5 m/min, and passed through the hot air crosslinking device 9 at a speed V2 of 8.3 m/min. Therefore, the ratio V2/V1 between the speeds V2 and V1 was 1.28.

The microwave crosslinking device 8 had an output of 6 kW and an internal control temperature of 160° C. The hot air crosslinking device 9 had an internal control temperature of 250° C. and an effective heating vessel length of 8 m.

(Production of Electrically Conductive Roller)

The resulting rubber foam tube 5 was cut to a predetermined length to provide a roller body 12. A metal (SUM-24L) shaft 14 having an outer diameter of 6 mm and an outer peripheral surface to which an electrically conductive thermosetting adhesive agent was applied was press-inserted into a center through-hole 13 of the roller body 12, and heated to 160° C. for 60 minutes in a hot air oven to cure the thermosetting adhesive (secondary crosslinking). Thus, the roller body 12 was electrically connected to and mechanically fixed to the shaft 14.

An outer peripheral surface 11 of the roller body 12 was polished by a traverse polishing process utilizing a cylindrical polisher to be thereby finished as having an outer diameter of 12 mm, and opposite end portions of the roller body 12 were cut. Thus, an electrically conductive roller 10 was produced.

Example 2

A rubber foam tube was produced in substantially the same manner as in Example 1, except that the tubular body 4 was passed through the microwave crosslinking device 8 at a speed V1 of 7.5 m/min and passed through the hot air crosslinking device 9 at a speed V2 of 9.5 m/min, and the ratio V2/V1 between the speeds V2 and V1 was 1.27. Then, the electrically conductive roller was produced by using the rubber foam tube thus produced.

Example 3

An electrically conductive rubber composition was prepared in substantially the same manner as in Example 1, except that the amount of the foaming agent was 2 parts by mass based on 100 parts by mass of the rubber component. A rubber foam tube was produced in substantially the same manner as in Example 1, except that the electrically conductive rubber composition thus prepared was used, and the tubular body 4 was passed through the microwave crosslinking device 8 at a speed V1 of 6.5 m/min and passed through the hot air crosslinking device 9 at a speed V2 of 10.2 m/min, and the ratio V2/V1 between the speeds V2 and V1 was 1.57. Then, the electrically conductive roller was produced by using the rubber foam tube thus produced.

Example 4

An electrically conductive rubber composition was prepared in substantially the same manner as in Example 1, except that 80 parts by mass of the NBR and 20 parts by mass of the ECO were used for the rubber component and the amount of the foaming agent was 0.8 parts by mass based on 100 parts by mass of the rubber component. A rubber foam tube was produced in substantially the same manner as in Example 1, except that the electrically conductive rubber composition thus prepared was used, and the tubular body 4 was passed through the microwave crosslinking device 8 at a speed V1 of 6.5 m/min and passed through the hot air crosslinking device 9 at a speed V2 of 10.2 m/min, and the ratio V2/V1 between the speeds V2 and V1 was 1.57. Then, the electrically conductive roller was produced by using the rubber foam tube thus produced.

Comparative Example 1

A rubber foam tube was produced in substantially the same manner as in Example 3, except that the tubular body 4 was passed through the microwave crosslinking device 8 at a speed V1 of 6.5 m/min and passed through the hot air crosslinking device 9 at a speed V2 of 11.5 m/min, and the ratio V2/V1 between the speeds V2 and V1 was 1.77. Then, the electrically conductive roller was produced by using the rubber foam tube thus produced.

Comparative Example 2

A rubber foam tube was produced in substantially the same manner as in Example 4, except that the tubular body 4 was passed through the microwave crosslinking device 8 at a speed V1 of 6.5 m/min and passed through the hot air crosslinking device 9 at a speed V2 of 11.5 m/min, and the ratio V2/V1 between the speeds V2 and V1 was 1.77. Then, the electrically conductive roller was produced by using the rubber foam tube thus produced.

<Determination of Outer Diameter Change Percentage>

The outer diameter of a widthwise middle portion of each of the roller bodies of the electrically conductive rollers produced in Examples and Comparative Examples was measured with the use of a laser outer diameter measurement device. The measurement was carried out immediately after the production of the respective electrically conductive rollers and after a lapse of 14 days during which the electrically conductive rollers were each allowed to stand at a temperature of 23° C. at a relative humidity of 55%. An outer diameter change percentage (%) was determined from the following expression (1):

$$\text{Outer diameter change percentage (\%)} = \phi 1/\phi 0 \times 100 \quad (1)$$

wherein $\phi 0$ is the outer diameter measured immediately after the production and $\phi 1$ is the outer diameter measured after a lapse of 14 days.

An electrically conductive roller having an outer diameter change percentage of less than 1% was rated as acceptable (○), and an electrically conductive roller having an outer diameter change percentage of not less than 1% was rated as unacceptable (×).

TABLE 2

| | Example 1 | Example 2 | Example 3 | Example 4 | Comparative Example 1 | Comparative Example 2 |
|---|---|---|---|---|---|---|
| | Parts by mass | | | | | |
| NBR | 70 | 70 | 70 | 80 | 70 | 80 |
| EPDM | 10 | 10 | 10 | — | 10 | — |
| ECO | 20 | 20 | 20 | 20 | 20 | 20 |
| Foaming agent | 4 | 4 | 2 | 0.8 | 2 | 0.8 |

TABLE 2-continued

|  | Example 1 | Example 2 | Example 3 | Example 4 | Comparative Example 1 | Comparative Example 2 |
|---|---|---|---|---|---|---|
| Speed | | | | | | |
| V1 (m/min) | 6.5 | 7.5 | 6.5 | 6.5 | 6.5 | 6.5 |
| V2 (m/min) | 8.3 | 9.5 | 10.2 | 10.2 | 11.5 | 11.5 |
| Ratio V2/V1 | 1.28 | 1.27 | 1.57 | 1.57 | 1.77 | 1.77 |
| Evaluation | | | | | | |
| Outer diameter change percentage (%) | 0.08 | 0.10 | 0.41 | 0.35 | 1.18 | 1.14 |
| Rating | ○ | ○ | ○ | ○ | x | x |

The results for Examples 1 to 4 and Comparative Examples 1 and 2 shown in Table 2 indicate that, where the ratio V2/V1 between the speed V2 at which the extruded tubular body passes through the hot air crosslinking device and the speed V1 at which the extruded tubular body passes through the microwave crosslinking device is not less than 1.0 and not greater than 1.6, the roller body of the electrically conductive roller has a smaller outer diameter change with an outer diameter change percentage of less than 1% after the production.

The results for Examples 1 to 4 indicate that the ratio V2/V1 is preferably not greater than 1.3 for further improvement of the effect.

This application corresponds to Japanese Patent Application No. 2012-270602 filed in the Japan Patent Office on Dec. 11, 2012, the disclosure of which is incorporated herein by reference in its entirety.

What is claimed is:

1. A production method for producing a rubber foam tube, the method comprising the steps of:
    extruding a rubber composition containing a foaming agent into a tubular body;
    continuously feeding the extruded tubular body in an elongated state without cutting to pass the tubular body through a microwave crosslinking device and then through a hot air crosslinking device to continuously foam and crosslink the rubber composition;
    wherein the tubular body passes through the microwave crosslinking device at a speed V1 which is not less than 6 m/min and not greater than 8 m/min; and
    wherein the tubular body passes through the hot air crosslinking device at a speed V2 such that a ratio V2/V1 is not less than 1.2 and not greater than 1.6.

2. The production method according to claim 1, further comprising the step of polishing an outer peripheral surface of the rubber foam tube after the foaming and crosslinking step for producing an electrically conductive roller.

* * * * *